United States Patent [19]

Blaser

[11] 4,433,660

[45] Feb. 28, 1984

[54] FUELING SYSTEM FOR INTERNAL COMBUSTION ENGINE

[76] Inventor: Richard F. Blaser, 210 Caroline St., Cape Canaveral, Fla. 32920

[21] Appl. No.: 314,016

[22] Filed: Oct. 22, 1981

[51] Int. Cl.$^3$ ............................................. F02B 3/06
[52] U.S. Cl. .................................. 123/266; 123/255; 123/274; 123/275
[58] Field of Search ................ 123/266, 255, 274, 275

[56] References Cited

U.S. PATENT DOCUMENTS

| Re. 29,978 | 5/1979 | Leshner et al. | 123/297 |
| 2,436,090 | 2/1948 | Bobine, Jr. | 123/266 |
| 3,710,764 | 1/1973 | Jozlin | 123/266 |
| 4,061,114 | 12/1977 | Christopher | 123/266 |
| 4,303,045 | 12/1981 | Austin, Jr. | 123/266 |
| 4,361,122 | 11/1982 | Latsch | 123/266 |

FOREIGN PATENT DOCUMENTS 2842504  4/1980  Fed. Rep. of Germany ...... 123/266

*Primary Examiner*—Raymond A. Nelli
*Attorney, Agent, or Firm*—Bacon & Thomas

[57] ABSTRACT

A device for supplying flash evaporated fuels directly to the combustion chamber of an internal combustion engine includes a housing that is secured to the engine adjacent the combustion chamber and a liquid fuel holding chamber within the housing that is in direct heat exchange relationship with the combustion chamber so that the liquid fuel in the chamber is superheated while the engine is operating. Liquid fuel supplied to the device is drawn into the holding chamber during each intake event of the combustion chamber and is also withdrawn from the holding chamber during the intake event. The holding chamber retains a larger volume than is normally admitted during each intake event and the fuel is further heated by passing same through a restricted passageway that is also in direct heat exchange relationship with the combustion chamber. A process for flash evaporating liquid fuel in the combustion chamber of an IC engine is also disclosed, and includes the steps of cyclically drawing liquid fuel from a pressurized fuel supply into a liquid fuel holding chamber and subjecting same to combustion chamber temperature to superheat the liquid fuel, followed by cyclically drawing a portion of the superheated fuel from the holding chamber into the combustion chamber after a first series of combustion events have occurred so that the fuel flash vaporizes in the combustion chamber during a fuel intake event. The invention also includes an adapter whereby the flash vaporization device cooperates with a precombustion chamber having a smaller volume than the combustion chamber, with an igniter for initiating combustion in the precombustion chamber in advance of the combustion chamber.

16 Claims, 3 Drawing Figures

FUELING SYSTEM FOR INTERNAL COMBUSTION ENGINE

BACKGROUND OF THE INVENTION

The invention relates to a fueling system for supplying optional alternative motor fuels to the combustion chamber of an internal combustion engine operable in an Otto or diesel cycle.

In the prior art, various fuel injector arrangements are well-known wherein liquid fuel is directly injected into a variable volume working chamber of an internal combustion engine as well as into the aspirated air stream in an intake manifold for supplying a fuel mixture to the working chamber. However, it is typical in such devices to provide sophisticated pumping or fuel injection timing mechanisms to ensure that the fuel is injected into the working chamber at precisely the right moment during the combustion cycle. Complete and smooth vaporization of the fuel before ignition is difficult to achieve yet is virtually required for a smooth combustion process to take place.

BRIEF SUMMARY OF THE INVENTION

The present invention is a fueling system for admitting flash evaporated fuel into the working chamber of an internal combustion engine during the intake event and which achieves virtually instantaneous and complete vaporization of the liquid fuel in the working chamber.

In accordance with the present invention, liquid fuel is supplied to a holding chamber in the combustion zone of the working chamber of an internal combustion engine during an initial intake event or series of intake events, and while it is held in the auxiliary holding chamber it is subjected to the pressure and temperature conditions existing in the combustion zone of the working chamber through an open restricted passage that is in communication with the working chamber and this results in the liquid fuel within the holding chamber to become superheated during subsequent working cycles. During subsequent intake events, the reduction in pressure in the working chamber draws out a quantity of fuel from the holding chamber which mixes with independently supplied air to enable ignition and heating of the combustion zone.

During subsequent intake events, the fuel which becomes superheated, is drawn by suction from the holding chamber through the passage, and into the working chamber where it immediately flash evaporates to form the fuel charge.

The timing of the fuel supplied to the working chamber is totally dependent upon pressure variations within the working chamber so independent timing of the supply of air is not required. The timing of the fuel is ensured by using a valve at the upstream end of the holding chamber and a liquid fuel metering means for regulating the rate of flow of liquid fuel into the holding chamber during each intake event. In a preferred embodiment, liquid fuel is supplied to the fueling device constructed in accordance with this invention at a pressure that is correlated with the power requirements for the engine. A normally closed check valve only permits the passage of liquid fuel from the supply line into the holding chamber when the pressure within the holding chamber drops to a preselected value below that of the fuel supply. When the required pressure differential no longer exists, the check valve closes and liquid is retained within the holding chamber until it is drawn therefrom into the combustion zone of the working chamber.

Accordingly, specific timing of the fuel supply to each working chamber is not required and complete, virtually instantaneous flash vaporization of the liquid fuel in the combustion or working chamber is assured.

The invention furthermore contemplates a process of supplying fuel to a working chamber wherein liquid fuel is drawn into a holding chamber that is in heat exchange relationship with the combustion zone and in direct, open communication through a restricted passage with the working chamber, wherein a portion of liquid fuel is withdrawn from the holding chamber during each intake event of the working cycle. The process furthermore contemplates super heating of the liquid fuel while it is in the holding chamber, whereby immediately flash vaporization of the fuel occurs as it is drawn into the working chamber through the open passage.

DESCRIPTION OF THE DRAWINGS

Reference is made to the appended drawings schematically illustrating the preferred embodiment of the invention, and wherein.

DETAILED DESCRIPTION OF PREFERRED EMBODIMENT

Figure 1:
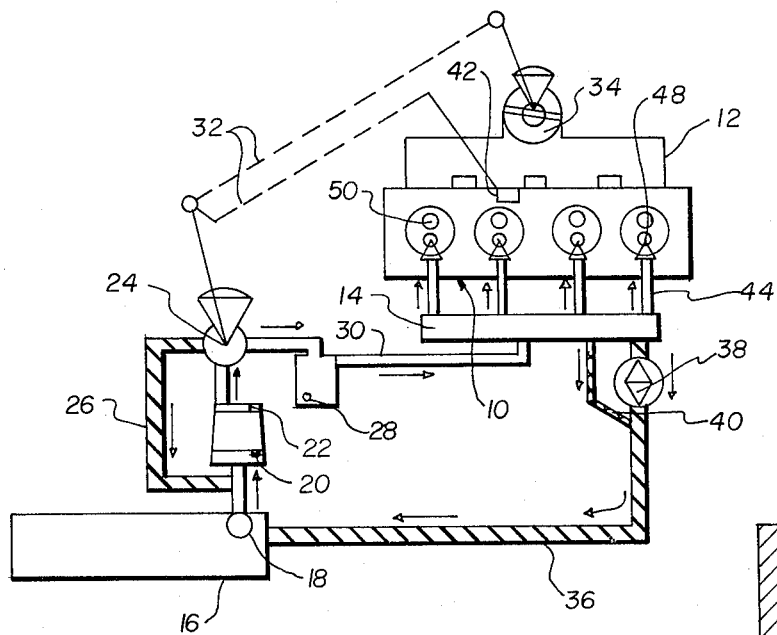
FIG. 1 is a schematic illustration of a fuel and air delivery system for an internal combustion engine provided with the fueling system of the present invention.

With reference to FIG. 1, an internal combustion engine 10 operable in Otto or diesel cycle and including variable volume combustion or working chambers (not shown) therein, includes an air intake manifold 12 and a liquid fuel supply rail 14 in communication with fuel intake ports (to be described) associated with each combustion chamber.

Liquid fuel is supplied to the fuel rail 14 from fuel reservoir 16 by means of a booster pump 18, and a fuel delivery pump 20 that includes a pressure regulator 22. A fuel throttle 24 controls flow of liquid fuel from the pump 20 to the fuel rail 14, excess fuel supplied by the pump being bypassed through line 26 to the intake side of pump 20 or, not illustrated, to the reservoir 16. A fuel filter 28 may be provided in the fuel delivery system, for example, as illustrated, in the fuel delivery line 30.

The fuel throttle 24 is connected by a suitable linkage or other appropriate connection 32 to an air throttle 34 that modulates air intake into the air manifold 12, in a manner to be described. The fuel throttle 24 enables control of fuel pressure in the rail 14 in accordance with engine power requirements.

Excess fuel from the fuel rail 14 is returned to the reservoir 16 via line 36, which includes a pressure regulator 38 and a bleed line 40 for ensuring minimum fuel flow.

If desired, an engine operating condition sensor 42 can be interconnected in the air proportioning system 32 for more precise control of the air throttle 34 under varying operating conditions of the engine.

Independent fuel supply lines 44 are provided for each fuel intake port of the engine 10 and these provide communication between rail 14 and the individual fueling system for each combustion chamber of the engine. Accordingly, each fuel supply line 44 is connected to a fueling device 48 that controls admission of liquid fuel into each combustion chamber. A spark plug 50 may be provided for each combustion chamber of the engine 10. In the case of a diesel cycle engine, the plug 50 may be a glow plug for starting.

Figure 2:
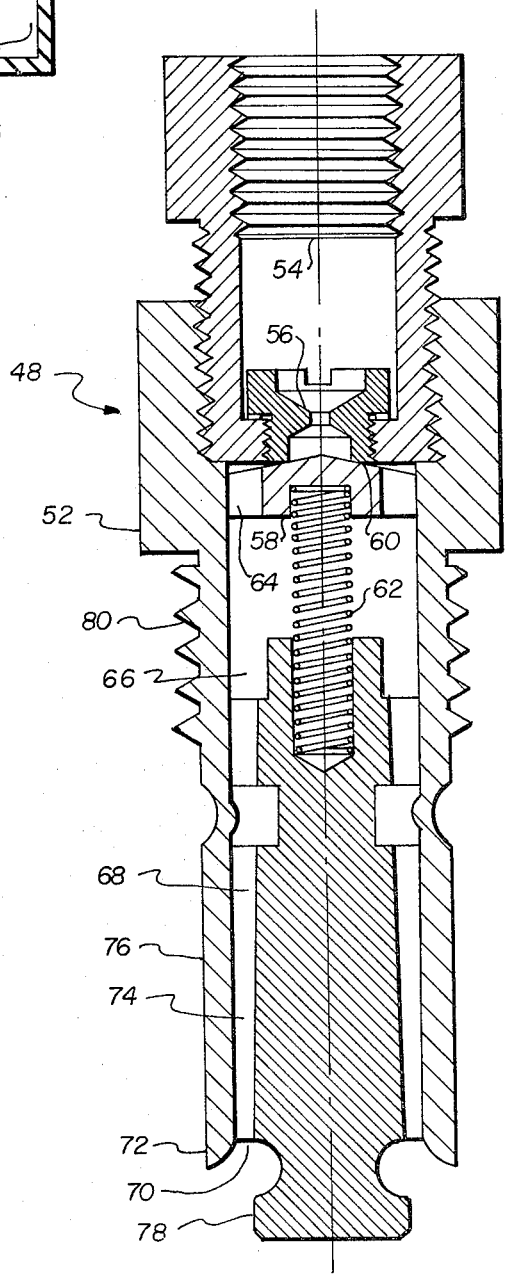
FIG. 2 illustrates a device embodying the fueling system in accordance with the present invention.

In FIG. 2 there is illustrated a preferred embodiment of the fueling device 48 that regulates admission of liquid fuel into each combustion chamber. The device 48 includes a housing 52 having a liquid fuel supply port 54 at one end, a fuel flow metering jet 56, and a one-way check valve 58 that is normally held closed against a seat 60 by a spring 62. The valve element 58 includes opening 64 for the free passage of liquid fuel around the valve element when the latter is moved away from its seat and liquid fuel is drawn into the housing 52 through the jet 56 from the port 54.

The housing 52 is provided with a liquid fuel holding chamber generally indicated at 66 that is in open communication with restricted passages 68 which in turn are in open communication with opening 70 in the distal end 72 of the housing 52.

In the illustrated embodiment, the passages 68 are provided in the form of shallow ridges in a central body 74 that is swaged within an elongated tubular section 76 of housing 52. The passages 68 are shown as being axially straight along the length of the housing 52, but they could also be helically curved around the central body 74, since it is highly desirable to provide as much time as possible for the fuel to pass from the reservoir portion of chamber 66 to the outlet opening 70. The passages 68 must be in intimate heat exchange relationship with the housing 52, particularly the thin-walled, tubular section 76 which is normally located at least in part within the combustion zone of the combustion chamber.

A thermal mass 78 is provided adjacent the outlet opening 70 of the passages 68 so that it lies in heat exchange relationship with the fluid that is drawn from the passages 68 during an intake event within the combustion chamber, as will be explained momentarily. The mass 78 is illustrated as an integral part of the central body 74 and is shaped in a manner to accommodate the sudden expansion of liquid fuel as it flash evaporates upon being drawn from the passages 68.

The housing 52 is provided with screw threads 80 which preferably are standard spark plug threads, whereby the device 48 can be accommodated within a standard spark plug opening of an internal combustion engine. It is contemplated that a duplicate spark plug opening will also be provided to accommodate the usual spark plug if the device 48 is to be directly threaded into the head of an engine so that it extends into the combustion chamber, although preferably the use of an adaptor is preferred, whereby the device 48 and the usual spark plug are both supported by the adaptor which itself is inserted into a single spark plug opening and secured therein by mating threads. This will be better understood during the discussion of FIG. 3 to follow.

The jet 56 preferably is threaded into a part of the housing 52 and a suitable shim is provided so that the clearance between the valve 58 and the valve seat 60 can be established.

The operation of the device 50 is as follows. Pressurized liquid fuel supplied to port 54 normally cannot enter the liquid holding chamber 66 due to the force of spring 62 holding valve 58 closed. The force of spring 62 is calibrated to prevent entry of liquid fuel into the holding chamber until a certain pressure differential across the valve 58 occurs. The device 48 is secured in place on the engine so that the distal end portion 76 of housing 52 extends into a combustion zone within the combustion chamber area. In such position, the openings 70 are in direct open communication with the combustion zone and transmit all pressure variations that exist in the combustion zone to the liquid holding chamber 66. During an intake event within the combustion chamber, the pressure within the combustion chamber drops while the upstream liquid pressure in the fuel inlet port 54 remains at some elevated value. At some point the valve 58 will open due to the pressure differential that occurs across this element, resulting in a quantity of liquid fuel being admitted into the chamber 66 through the jet orifice 56. The orifice 56 is calibrated, of course, so that the quantity of liquid flowing therethrough is precisely metered to provide the desired rate of flow of fuel into the chamber 66 while at the same time the upstream pressure of liquid fuel at port 54 is controlled in response to power demand of the engine by throttle 24.

During the first intake stroke or series of intake strokes, the chamber 66 fills with liquid fuel but the liquid fuel does not immediately run down into the combustion chamber in volume since on each compression power and exhaust stroke the pressure within the combustion chamber tends to retain the liquid fuel within the holding chamber 66. A portion of fuel is thereafter ignited in the combustion chamber and thereafter during continued operation of the engine, the tubular portion 76 of housing 52 experiences a heating effect which causes a transfer of heat energy into the liquid fuel contained within the holding chamber 66. Upon the occurrence of later intake events, liquid fuel is highly activated, superheated condition is withdrawn from the chamber 66 during each intake and passes through outlet 70 in a highly energized form whereupon it is instantly vaporized, mixed with the air that has been separately supplied to the combustion chamber through the manifold 12 and is reacted in a combustion process. During each intake event, only a portion of the liquid fuel within chamber 66 is drawn into the combustion zone so that an appropriate amount of time is provided for the liquid fuel passing through the valve 58 to be heated to a superheated condition. The natural pressure forces within the combustion chamber provide natural timing of the flow of liquid fuel into the chamber 66 and out of the opening 70 so that no additional timing of fuel supply is necessary with this invention. The thermal mass 78 contributes to the heating affect of the fuel drawn from the opening 70 at the moment the fuel is being diffused into the surrounding air within the combustion zone of the working chamber.

Figure 3:
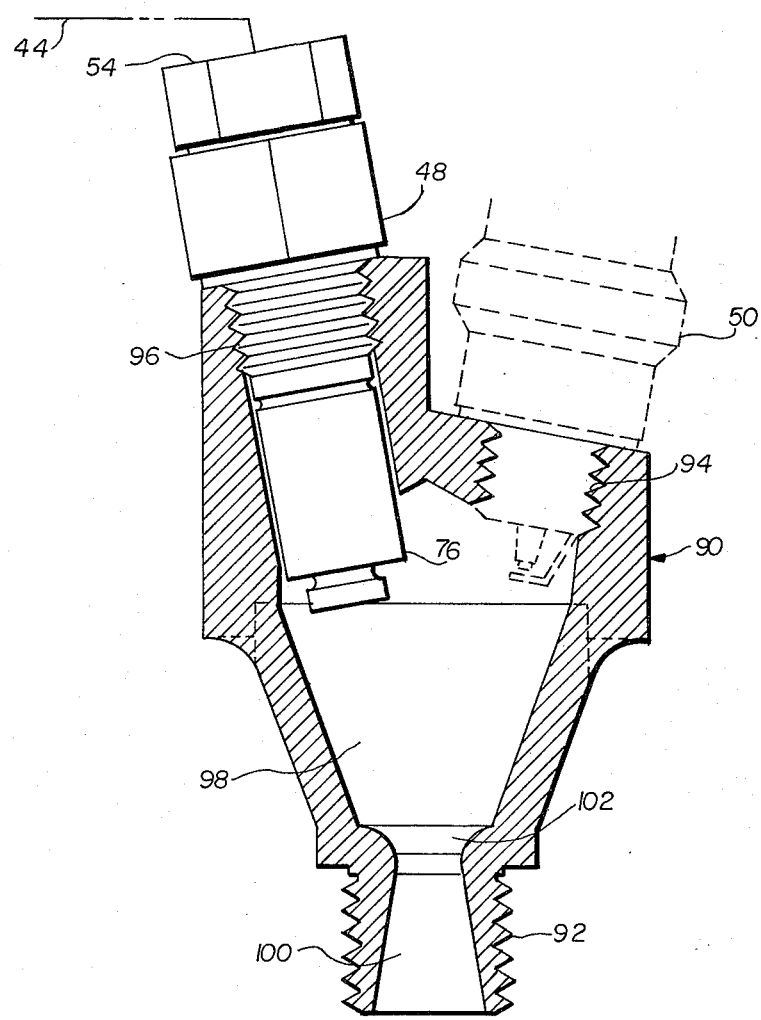
FIG. 3 shows an adapter for mounting the fueling system on an engine and for converting the working chamber to a stratified charge system.

In FIG. 3 there is illustrated an adaptor 90 having a screw threaded end portion 92 for enabling mounting of the adaptor 90 into the usual screw threaded spark plug port of an engine. The adaptor 90 moreover is provided with a spark plug opening 94 in which a spark plug 50 can be inserted and a second opening 96 into which the fueling device 48 illustrated in FIG. 2 is mounted. The distal end 76 of the fueling device 48 extends into a secondary chamber 98 that is in direct communication with the working chamber (not shown) through central opening 100. The volume of the secondary chamber 98 is kept to a minimum to prevent substantial change in the compression ratio of any engine and the adaptor 90 permits the fueling device 48 to interact with the combustion zone of the combustion chamber in a direct manner whereby the openings 70 of the passages 68 are in open, direct communication with the pressure variation and the temperature conditions within the combustion zone.

By proper selection of the volume of secondary chamber 96 with respect to the primary combustion chamber volume, and by providing a venturi throat 102 in combination with a nozzle mouth shaped 100, a standard Otto or diesel working chamber can be converted to a stratified charge working chamber. In the preferred embodiment, the volume of chamber 98 is between 10 and 35 percent of the total combined volume of the working chamber at minimum volume and the secondary chamber. The venturi throat 102 should be not more than 30 percent of the maximum cross sectional area of the secondary chamber 98 so that supersonic flow into the combustion chamber from the secondary chamber 98 will always be assured during combustion and expansion parts of the working cycle.

It will be clear that, with the use of the adaptor 98 as shown in FIG. 3, a rich fuel-air mixture will be formed in the secondary chamber 98 during each fuel intake event and the fuel-air mixture in the primary combustion chamber will be a lean mixture. Ignition of the mixture by spark plug 50, which preferably is located between distal end 76 and the opening 100, close to the distal end 76, will occur in the rich mixture area of the secondary chamber 98 and the burning gases will be jetted at supersonic flow conditions into the main combustion chamber for igniting a leaner mixture in the latter.

The foregoing preferred embodiment is intended to be exemplary for enabling an understanding of the invention, the scope of which is intended to be limited solely by the claims appended hereto.

I claim:

1. A fueling system for directly supplying flash evaporated fuels to the combustion chamber of an internal combustion engine operable in an Otto or diesel cycle during an intake event comprising:
   a housing arranged to be secured to the engine;
   a liquid fuel holding chamber in the housing and at least one restricted passageway providing communication between the holding chamber and the combustion chamber;
   a liquid fuel supply duct including fuel metering means in communication with the liquid fuel holding chamber;
   a one-way flow controller (e.g., check valve) for permitting flow of liquid fuel from the supply duct to the holding chamber only when the pressure in the duct exceeds the pressure in the chamber by a predetermined differential pressure and for preventing flow otherwise;
   said liquid fuel holding chamber and restricted passageway having a total volume sufficient to contain a liquid fuel supply sufficient for two or more combustion cycles of the engine combustion chamber;
   said housing having means for securing same to the engine adjacent the combustion chamber so that said liquid fuel holding chamber and the entire restricted passageway are in direct heat exchange relationship with the combustion chamber during operation of the engine, whereby liquid fuel in the chamber and passageway is compressed and superheated during each combustion event and is directly flash vaporized into the combustion chamber during the intake portion of the combustion cycle after the housing has been preheated during the first few combustion cycles.

2. Fueling system as claimed in claim 1, said liquid fuel holding chamber defined by a highly thermally conductive portion of said housing.

3. Fueling system according to claim 2, said passageways being tapered towards a smaller opening as they approach the combustion chamber.

4. Fueling system according to claim 1, including an adaptor for securing said housing to the engine, the adaptor including an interior chamber communicating with the engine combustion chamber through said port on the engine, said adaptor including an opening communicating with the interior chamber for receiving an ignition initiator such as a spark or glow plug, said interior chamber being disposed between the distal end of the housing and the engine combustion chamber, said interior chamber having a substantially smaller volume than the combustion chamber minimum volume.

5. Fueling system according to claim 4, said interior chamber communicating with said primary combustion chamber through a restricted venturi throat.

6. Fueling system according to claim 5, said interior chamber and venturi throat being dimensioned to create supersonic flow conditions through the venturi throat during the expansion part of the combustion cycle.

7. Fueling system according to claim 6, said interior chamber and venturi throat being dimensioned to form a precombustion zone where a rich fuel mixture can be ignited after the intake event and the products of combustion discharged through the venturi into the combustion chamber to cause combustion of a leaner charge in the combustion chamber during each working cycle of the combustion chamber.

8. A process for supplying optional alternative motor fuels to a variable volume combustion chamber of an internal combustion engine operable in an Otto or diesel cycle, said cycle including an intake event creating suction at a fuel intake port of the combustion chamber of the engine comprising steps of:
   (a) supplying liquid fuel independently of combustion air at the fuel intake port under a predetermined pressure;
   (b) cyclically drawing liquid fuel through the port into a liquid fuel holding chamber located within the combustion zone by the suction created during a first or series of intake events while preventing upstream flow of the liquid fuel out of the chamber during the other portions of the combustion cycle or cycles, and while permitting the liquid fuel in the holding chamber to be subjected to combustion chamber temperature to superheat the liquid fuel therein;
   (c) cyclically drawing a portion of the liquid fuel from the holding chamber into the combustion chamber during a later intake event or series of later intake events through one or more elongated restricted passageways that also are in direct heat exchange relationship with the combustion chamber after the liquid fuel in the holding chamber has been superheated;

(d) whereby flash vaporization of the superheated fuel occurs directly within the combustion chamber upon discharge of the fuel from the passageway or passageways.

9. The process according to claim 8, wherein the quantity of liquid fuel drawn in during the intake event or events is metered by a passive flow control jet orifice located in the flow path of incoming liquid flow at the intake port area.

10. The process according to claim 8, wherein the fuel drawn from the holding chamber into the combustion chamber is passed over a thermal mass as it is drawn into the combustion chamber, the thermal mass comprising a heat storing body that is openingly exposed to the interior of the combustion chamber.

11. The process according to claim 8, wherein the amount of liquid fuel drawn from the holding chamber during each intake event is less than one-half the volume of the holding chamber.

12. The process according to claim 8, wherein the combustion chamber is divided into primary and secondary chambers, the former being substantially greater in volume than the latter and comprising the variable volume part of the combustion chamber, the primary and secondary chambers connected by a venturi throat, said step of cyclically drawing a portion of the liquid fuel into the combustion chamber comprising drawing the liquid fuel only into the secondary chamber, and including the step of supplying air to the primary and secondary combustion chambers to establish a rich, readily ignitable fuel-air mixture in the secondary chamber and a lean fuel-air mixture in the primary chamber, and the step of igniting the rich mixture in the secondary chamber during the combustion cycle, whereby the expanding burning mixture in the secondary chamber is jetted through the venturi throat into the primary chamber to ignite the lean mixture.

13. The process according to claim 12, including passing said expanding burning mixture from the secondary to the primary chambers under supersonic flow conditions.

14. A fueling system according to claim 1 comprising a thermal mass adjacent the open end of the passageway, said mass arranged to be in heat exchange relationship with fuel vapor exiting the passageway.

15. A fueling system according to claim 14 wherein said passageway comprises multiple passages grouped peripherally around a solid central body.

16. A fueling system according to claim 14 wherein said passageway comprises multiple passages grouped peripherally around a solid central body, said central body integral with said thermal mass.

* * * * *